United States Patent

[11] 3,566,069

[72] Inventor Harold R. Henderson
Lancaster, Ohio
[21] Appl. No. 864,937
[22] Filed Sept. 19, 1969
[45] Patented Feb. 23, 1971
[73] Assignee Arcair Company
Lancaster, Ohio
Continuation-in-part of application Ser. No. 577,935, Sept. 8, 1966, now abandoned.

[54] CUTTING AND GOUGING METAL BY AIR CARBON-ARC PROCESS
5 Claims, 4 Drawing Figs.
[52] U.S. Cl. .................................................. 219/70
[51] Int. Cl. .................................................. B23p 1/12
[50] Field of Search .................................... 219/68, 69
(E,F,M,V), 70, 73, 145, 145.5, 146.8; 145/20, 24, 26; 158/27.4 (B)

[56] References Cited
UNITED STATES PATENTS

| | | | |
|---|---|---|---|
| 369,908 | 9/1887 | Blair | 145/26X |
| 1,074,755 | 10/1913 | Spira | 158/27.4BUX |
| 1,481,854 | 1/1924 | Armstrong | 219/145X |
| 2,346,718 | 4/1944 | Anderson | 158/27.4BUX |
| 2,699,805 | 1/1955 | Richter | 145/20 |
| 2,751,482 | 6/1956 | Stepath | 219/70 |
| 3,125,665 | 3/1964 | Snider | 219/69(E) |

OTHER REFERENCES

"Model E" sheet, Elox Corporation, Troy, Michigan, Nov. 1944 (copy in Gr. 213, Class 219-70)

Primary Examiner—R.F. Staubly
Attorney—Beveridge & DeGrandi

ABSTRACT: An improved method of cutting a gouge in metal or filleting the corner edge of a metal block by the conventional air carbon-arc cutting and gouging process of gripping a consumable electrode with the electrode projecting toward the work while establishing a continuous arc between the electrode and the work to melt the work and, concurrently with the heating and melting, directing a free stream of air parallel to the axis of the electrode along its face to pass between the electrode tip and the work. The improvement involves gripping an electrode having a rectangular cross section and parallel opposing faces of which the transverse width is substantially greater than the electrode thickness between the faces, inclining the electrode to the work surface with a free stream of air directed along the downwardly inclined electrode face and moving the electrode along the work opposite to the direction of inclination.

PATENTED FEB23 1971 3,566,069

INVENTOR.
HAROLD R. HENDERSON
BY
Browne, Schuyler & Beveridge
ATTORNEYS

CUTTING AND GOUGING METAL BY AIR CARBON-ARC PROCESS

This is a continuation-in-part application of now abandoned application Ser. No. 577,935, filed Sept. 8, 1966.

This invention relates to carbon electrodes for use in air carbon-arc cutting and gouging operations and particularly to an improved method of removing metal by use of the cutting and gouging process.

The air carbon-arc cutting or gouging process is widely used in the metal working industry to rapidly remove relatively large quantities of metal from heavy metal bodies. This process is described, for example, in Stepath U.S. Pat. No. 2,706,236, and is indicated to be one of the six types of processes for cutting and gouging metal in Section Three at Chapter 51 of the Welding Handbook, Fourth Edition, which was published in 1959 by the American Welding Society and edited by Arthur L. Phillips. This process conventionally consists of striking and maintaining an arc between the metal body and a solid cylindrical carbon electrode to melt a portion of the metal body, and directing a free stream of high pressure air along the surface of the electrode parallel to its axis so that the air passes between the tip of the electrode and the work to blow the molten metal away. While this process has been successfully and widely used for many operations such as the gouging of slag or other defects from castings, billets, etc., it has not heretofore been entirely satisfactory for certain operations due to what was considered inherent limitations on the process. For example, steel billets which are to be rolled into shapes must be relatively free from any sharp corners or ridges as such sharp corners tend to form laps during the progressive rolling operation. However, it is frequently necessary to remove defects such as slag inclusions or the like from the steel billets before rolling and, in some cases involving high alloy steels, it is necessary to remove a quantity of material from all sides of the billet and to condition the corners for the rolling operation to eliminate any oxides or other slag formations from contaminating the high alloy steel. The use of the air carbon-arc process employing conventional cylindrical carbon rods has not been entirely satisfactory for these operations due to the fact that the metal was removed in a generally U-shaped trough, leaving relatively sharp corners at the edge of the trough after each pass of the electrode, particularly when the metal was removed from a corner. Also, when successive passes of the electrode were made to remove metal from a wide area, relatively sharp ridges were formed between adjacent passes, which sharp edges could result in laps being formed during the following rolling operation on the billet.

It is an object of this invention to provide an improved type carbon electrode for use in an improved air carbon-arc cutting and gouging operation.

Another object is to provide an improved air carbon-arc gouging process which may be employed to remove metal from a body of metal to leave a surface having a minimum of sharp edges.

Still another object is to provide such an improved air carbon-arc gouging process which may be employed to remove metal along the corner edge of a body of metal and provide a smooth rounded corner edge extending along the body.

Yet still another object is to provide an improved air carbon-arc gouging process as will establish a relatively wide gouge of substantially uniform depth along a metal body.

In the attainment of the above and other objects, an important feature of the invention resides in utilizing in the process a flat carbon electrode having a generally rectangular cross section and having parallel opposed faces of substantially greater transverse dimension that the thickness of the electrode between the faces. In use, the electrode is maintained in an attitude so that the longitudinal axis of the electrode makes an acute angle with the surface of the metal body being cut, with the electrode being inclined away from the direction of movement as it traverses the surface to be cut. During the cutting operation, the electrode is moved in the direction of the flat face of the electrode such that the line of intersection of the plane of the flat electrode and the surface of the metal body is substantially at 90° with respect to the direction of movement of the electrode over the metal body.

Other objects and advantages of the invention will become apparent from the following specification, taken with the drawings in which.

Figure 2:
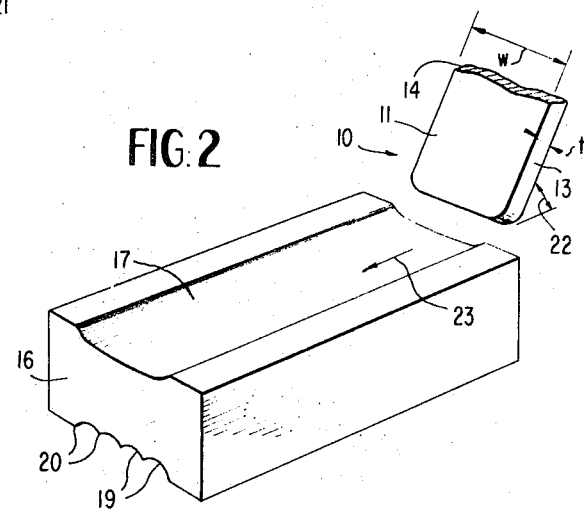
FIG. 2 is a perspective view of a steel billet which has had a portion of its upper surface removed in accordance with the present invention, and which has had a portion of its lower surface removed by a conventional electrode in the air carbon-arc cutting and gouging process as previously practiced.

Referring now to the drawings in detail, an electrode embodying the invention is indicated generally by the reference 10, and is shown as an elongated, flat solid carbon rod defined between two flat, parallel, front and rear faces 11, 12 bounded on either side and separated by the relatively narrow edge surfaces 13, 14 to produce a substantially rectangular cross section. The edge surfaces 13, 14 need not be flat but can be filleted so the edge surfaces 13, 14 are slightly convex. As illustrated in FIG. 2, the front and rear faces 11, 12 have a transverse dimension $w$ which is substantially greater than the transverse dimension $t$ of the edge surfaces 13, 14. The dimension $w$ is at least 3 times, and preferably at least 4 times as great as the dimension $t$.

Since the electrode 10 is of a uniform thickness, and further since an extremely high current is employed in the operation of a cutting and gouging torch, an arc struck between the tip 15 of electrode 10 and a metal body, such as the billet 16, will be uniform throughout the full width of the electrode so long as the electrode is held in a position such that the distance from the surface of the metal body to the electrode tip is substantially equal across the transverse width of the electrode. This results in a uniform quantity of the metal on the surface of the metal body being melted which has a width substantially equal to the dimension of the face of the electrode lying across the surface of the workpiece so that a uniformly wide layer of material is removed with each pass of the electrode. If the electrode is positioned with its longitudinal axis substantially in a plane perpendicular to the work and containing the line of movement of the electrode across the work, the width of the gouge will be substantially that of the width of the electrode face. This is in contrast to the conventional cylindrical electrode 18 employed in air carbon-arc cutting and gouging operations in which the arc and heat therefrom is concentrated along the central portion of the path traversed by the electrode, with the result that a narrow and substantially U-shaped groove 19 or notch of material slightly wider than the diameter of the electrode is removed upon each pass of the electrode as illustrated in the lower portion of the workpiece in FIG. 2. As illustrated in that FIG., if a wide groove is to be cut, either a number or separate, parallel grooves must be cut which have parallel, sharply defined edges 20 or the cylindrical electrode has to be oscillated back and forth normal to the groove as the groove is cut, as explained on page 51.13 of the Welding Handbook of the American Welding Society that was previously mentioned. However, it is difficult and substantially impossible to produce a wide groove of uniform width and depth by this weaving or oscillating motion of the electrode that has been previously utilized with conventional electrodes.

Figure 1:
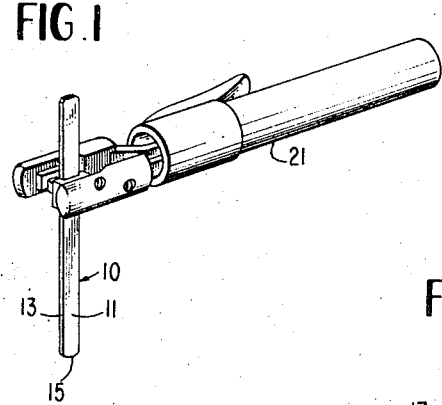
FIG. 1 is a rectangular electrode according to the present invention positioned in an electrode holder of the type conventionally employed in air carbon-arc cutting and gouging operations.

As illustrated in FIGS. 1 and 2, the rectangular electrode 10 is clamped in an electrode holder 21 and is positioned adjacent the surface of billet 16 from which the material is to be removed. The electrode holder is of the general type conventionally employed in air carbon-arc cutting and gouging operations, and includes means for directing a free stream of high pressure air longitudinally along the length of a face of the electrode to pass beneath the top of the electrode and the work and forcefully remove any molten metal from beneath the tip 15 of the electrode during the cutting operation. An electrode holder of this general type is illustrated and described in U.S. Pat. No. 2,706,236.

With the electrode 10 clamped in the electrode holder 18, the holder is then manipulated to position the electrode so that its longitudinal axis is inclined away from the direction of movement of the electrode over the work surface and makes an acute angle with the surface of the material from which the material is to be removed, this angle being indicated by the arrow 22 in FIG. 2. Also, the plane of the electrode faces 11, 12 is maintained to face in the direction of motion of the electrode so that the line of intersection between the plane of the faces 11, 12 and the surface of the billet 16 (i.e., the lower transverse edge of the electrode) will be at an angle of substantially 90° with respect to the direction of movement of the electrode over billet 16, as indicated by arrow 23. Although FIG. 2 represents the situation in which the line of movement of the electrode across the billet 16 is in the same vertical plane as the axis of the inclined electrode so that the width of the groove 17 is about the same as the transverse width $w$ of the electrode, the electrode could obviously be rotated to the left or right of the vertical plane passing through the line of motion of the electrode so that the lower edge of the electrode face is defined by a line extending obliquely to the electrode axis rather than perpendicular. In this case the oblique edge of the electrode is rather quickly established by erosion of the electrode after the arc is struck with the electrode axis being canted away from a vertical plane. However, even in the case of an electrode in which the lower edge has been eroded to produce an edge extending obliquely across the face, the inclined electrode should be maintained in a position such that the oblique lower edge is substantially perpendicular to the line of movement of the electrode. If not, slag and molten material will tend to pile up behind or to one side of the electrode instead of being blown out ahead of the electrode so as to produce a clean gouge. As the electrode traverses the surface of the metal body, the cooperaton of the electric arc and the airstream directed along the downwardly facing face of the electrode to pass beneath the tip of the electrode and the work will remove a band of material of uniform depth and a width substantially equal to the length of the lower edge of the electrode face overlying the work surface, in the case of an electrode positioned so that its axis is in the same plane as the electrode movement this will be the transverse width of the electrode.

Figure 4:
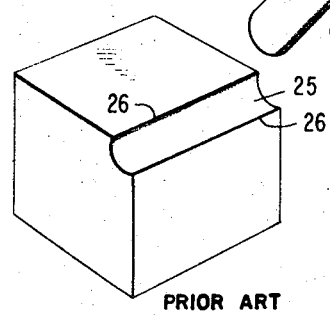
FIG. 4 is a view similar to FIG. 3 illustrating a metal billet having one corner edge removed by the conventional electrode in the air carbon-arc process.
Figure 3:
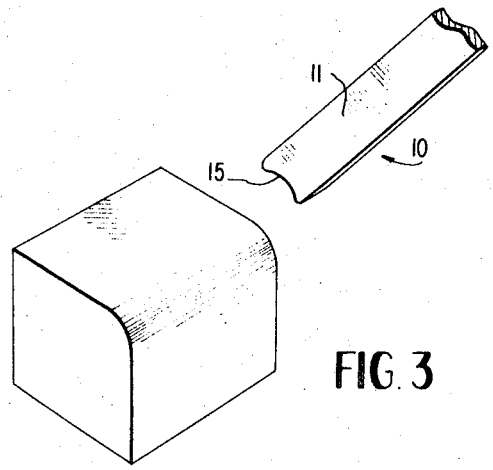
FIG. 3 is a perspective view of a metal billet which has had one corner edge removed by a rectangular electrode employed in accordance with the method of the present invention.

Referring now to FIGS. 3 and 4, the advantages of the improved method according to the present invention over the prior method utilizing conventional electrodes in removing metal from a corner edge of a billet and for providing a round, smooth corner edge along a billet are graphically illustrated. The electrode is maintained in an attitude with is longitudinal axis making an acute angle with the corner edge of the billet 16 and inclined away from the direction of movement along the corner edge. The process works best when the plane of the electrode faces 11, 12 is maintained as previously noted to establish the lower, transverse edge of the electrode extending across the corner edge of the billet approximately 90° to this corner edge along which the electrode is moved so that the axis of the electrode is contained in a plane containing the billet corner edge and extending through the metal body between the side surfaces defining the corner edge. Alternatively the electrode can be rotated so that the lower edge of the electrode extends at an oblique angle across its face as noted above with respect to straight cuts and this obliquely extending lower edge of the electrode maintained at approximately 90° to the corner edge of the billet.

The relatively great width-to-thickness ratio of the electrode 10 results in the tip 15 of the electrode being quickly eroded into a concave shape tending to "wrap around" the corner edge of the billet 16. The arc then extends outwardly to the full width of the electrode, and is "focused" on the corner edge to produce a smooth, rounded corner 24. In contrast, the conventional air carbon-arc process utilizing the conventional cylindrical rod 18 to remove material from the corner of a billet will leave a U-shaped trough 25 and will result in two relatively sharp edges 26 extending along and defining the corner edge of the billet as indicated in FIG. 4.

While I have disclosed a preferred embodiment of my invention, I wish it understood that I do not intend to be limited solely thereto, but that I do intend to include all embodiments thereof which would be apparent to one skilled in the art and which came within the spirit and scope of my invention.

I claim:

1. In a method of gouging metal from a workpiece wherein an arc is struck and maintained between the work and the projecting end of an exposed, consumable electrode continuously gripped in a clamp connected to a power source with a substantial portion of the electrode length exposed and projecting from the clamp toward the work to heat and melt metal underlying the electrode tip and, concurrently with said heating and melting, a free stream of air is continuously directed substantially parallel to the electrode axis along an exposed surface of the electrode to pass beneath the projecting end of the electrode and the work at a sufficiently high velocity to blow molten metal from beneath the arc, the improvement comprising gripping in said clamp an electrode having a substantially rectangular cross section and two parallel surface faces each having a transverse dimension at least three times the thickness of the electrode between said faces, positioning said electrode with its longitudinal axis inclined to the surface of the work with one of said faces over which an air stream flows facing toward the work surface, and moving said inclined electrode across the surface of the work in a direction opposite that of the inclination while maintaining the lower transverse edge of the electrode substantially perpendicular to the line of movement, thereby producing a wide gouge across the workpiece along the line of movement of the electrode.

2. The method of gouging metal in accordance with claim 1 wherein said lower transverse edge of the electrode is maintained substantially parallel to the work surface while said electrode is moved across said surface, thereby establishing a gouge of uniform depth.

3. The method of gouging metal in accordance with claim 2 wherein the longitudinal axis of said inclined electrode is maintained substantially in a vertical plane containing the line of movement of said electrode across the workpiece.

4. In the process of gouging metal by means of an electrode holder having a handle supporting a clamping means connected to a source of electric power in which said clamping means grips and holds an electrode with its longitudinal axis angularly disposed relative to the longitudinal axis of the handle and a substantial length of the electrode projects freely from the clamping means so an arc may be struck between the tip end of the electrode and metal work beneath the electrode tip end to heat and melt the metal beneath the electrode tip while, concurrently with said heating and melting a source of high pressure air connected to a nozzle orifice supported adjacent said clamping means in a position offset from the electrode axis is directed such that a high velocity stream of air from the orifice flows along one side of an electrode gripped in said clamping means substantially parallel to the electrode axis to pass between the tip end of the electrode gripped in said clamping means substantially parallel to the electrode axis to pass between the tip end of the electrode and the work with sufficient velocity to blow melted metal from beneath the arc, the improvement of clamping said clamping means on a carbon electrode having a substantially rectangular transverse cross section and two parallel faces each having a transverse dimension at least 3 times the thickness of the electrode with said electrode positioned such that the airstream from said orifice flows along one of said faces, positioning said holder to incline said electrode at an acute angle to the work surface with said one face facing toward the work, moving said holder in the direction of the other of said side faces while maintaining said arc between the gripped electrode and the work and directing high velocity air from said orifice along said one face, and, concurrently with said movement, maintaining said electrode in a position that the line of intersection of the plane of said one electrode face and the surface of said metal work remains substantially perpendicular to the direction of electrode movement across the metal piece, said holder being moved at a velocity that the tip end of said electrode moves across the work surface at a rate to establish a gouge in the work of the desired depth.

5. The method of claim 1 wherein the workpiece is a metal block having a sharp corner edge which is to be filleted to establish a convex surface between the surfaces of the block defining said corner edge, positioning said electrode includes inclining its longitudinal axis to establish an acute angle with said edge and the lower edge of the electrode straddling the edge, said heating and melting the electrode includes erosion of the electrode lower edge to a concave shape complementary to the shape desired for said convex block filleted surface and said electrode movement includes moving the eroded electrode substantially parallel to and along the block corner edge at a velocity that removes the metal from the sharp corner edge to form a uniformly convex filleted surface.